(12) United States Patent
Kalthoff et al.

(10) Patent No.: US 10,400,910 B2
(45) Date of Patent: Sep. 3, 2019

(54) COMBINATION AIR VALVE

(71) Applicant: DeZURIK, Inc., Sartell, MN (US)

(72) Inventors: Adam L. Kalthoff, Albany, MN (US); Forrest Halvorson, Becker, MN (US)

(73) Assignee: DeZURIK, Inc., Sartell, MN (US)

( * ) Notice: Subject to any disclaimer, the term of this patent is extended or adjusted under 35 U.S.C. 154(b) by 6 days.

(21) Appl. No.: 15/619,016

(22) Filed: Jun. 9, 2017

(65) Prior Publication Data

US 2017/0356567 A1 Dec. 14, 2017

Related U.S. Application Data

(60) Provisional application No. 62/348,434, filed on Jun. 10, 2016.

(51) Int. Cl.
| | |
|---|---|
| *F16K 31/22* | (2006.01) |
| *E03F 5/08* | (2006.01) |
| *F16L 55/07* | (2006.01) |
| *F16K 24/04* | (2006.01) |
| *F16K 31/122* | (2006.01) |

(52) U.S. Cl.
CPC ............... *F16K 31/22* (2013.01); *E03F 5/08* (2013.01); *F16K 24/044* (2013.01); *F16K 31/122* (2013.01); *F16L 55/07* (2013.01)

(58) Field of Classification Search
CPC .... F16K 24/042; F16K 24/044; F16K 24/048; F16K 31/22; F16K 31/122; E03F 5/08; F16L 55/07

See application file for complete search history.

(56) References Cited

U.S. PATENT DOCUMENTS

| | | | |
|---|---|---|---|
| 1,119,979 A | 12/1914 | Mulligan | |
| 1,629,789 A | 5/1927 | Harrison | |
| 2,179,750 A | 11/1939 | McCracken et al. | |
| 3,893,475 A * | 7/1975 | Hudson | F16K 31/34 137/414 |
| 4,414,006 A | 11/1983 | Armstrong et al. | |
| 4,586,528 A | 5/1986 | Andres et al. | |
| 4,696,321 A | 9/1987 | Reese et al. | |
| 5,065,575 A | 11/1991 | Cook et al. | |

(Continued)

FOREIGN PATENT DOCUMENTS

| | | | |
|---|---|---|---|
| EP | 0157437 B1 * | 5/1989 | ............. F16L 55/07 |
| WO | 2014055557 | 4/2014 | |
| WO | 2017214545 | 12/2017 | |

OTHER PUBLICATIONS

First Examination Report for Australian Patent Application No. 2013327419 dated Aug. 24, 2017 (2 pages).

(Continued)

*Primary Examiner* — Ian G Paquette
(74) *Attorney, Agent, or Firm* — Pauly, DeVries Smith & Deffner LLC

(57) ABSTRACT

The present disclosure is directed to a combination air valve that uses buoyancy to lift seals into place, preventing media from escaping from the valve. Once the seals are in place, pipeline pressure is used to open and close the valve. The combination air valve includes a low flow vent configured with a pressure equalizing configuration allowing for reduced extrusion forces along the low flow vent, allowing vertical movement of a float shaft at high valve gas pressures with reduced forces.

20 Claims, 15 Drawing Sheets

(56) References Cited

U.S. PATENT DOCUMENTS

| | | |
|---|---|---|
| 7,617,838 B2 | 11/2009 | Katzman et al. |
| 9,657,859 B2 | 5/2017 | Halvorson et al. |
| 2005/0268965 A1 | 12/2005 | Muller |
| 2006/0086388 A1 | 4/2006 | Fye |
| 2009/0139581 A1 | 6/2009 | Herlihy |
| 2013/0333775 A1 | 12/2013 | Shoval et al. |
| 2014/0060670 A1* | 3/2014 | Grassl ............ F16K 31/24 137/409 |
| 2014/0209175 A1 | 7/2014 | Cardia et al. |
| 2015/0267828 A1 | 9/2015 | Halvorson et al. |
| 2017/0074414 A1* | 3/2017 | Milroy ............ F16K 1/36 |

OTHER PUBLICATIONS

International Search Report and Written Opinion for PCT Application No. PCT/US2017/036811 dated Aug. 11, 2017 (9 pages).
"International Preliminary Report on Patenability," For PCT/US2013/062921 dated Apr. 16, 2015 (6 pages).
"International Search Report and Written Opinion," for PCT/US2013/062921, dated Dec. 26, 2013 (9 pages).
"Non-Final Office Action," for U.S. Appl. No. 14/435,087, dated Mar. 31, 2016 (12 pages).
"Notice of Allowance," for U.S. Appl. No. 14/435,087 dated Jan. 19, 2017 (8 pages).
"Response to Non-Final Office Action," for U.S. Appl. No. 14/435,087 filed with the USPTO Sep. 30, 2016 (8 pages).
International Preliminary Report on Patentability for PCT Application No. PCT/US2017/036811 dated Dec. 20, 2018 (7 pages).
Response to First Examination Report for Australian Patent Application No. 2013327419 filed with the Australian Patent Office on Apr. 11, 2018 (9 pages).

\* cited by examiner

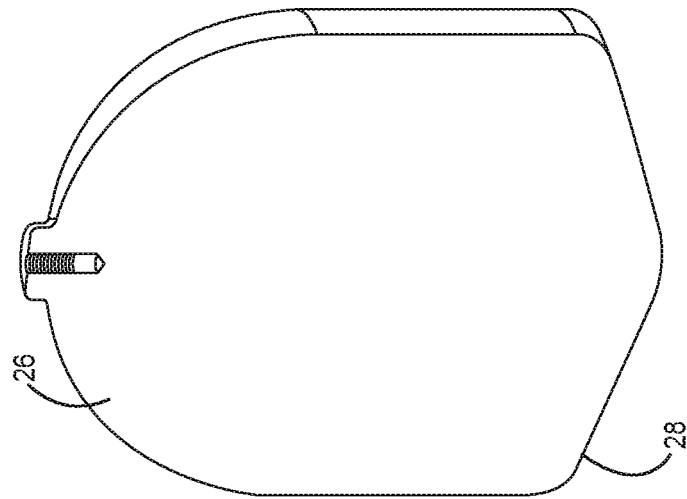
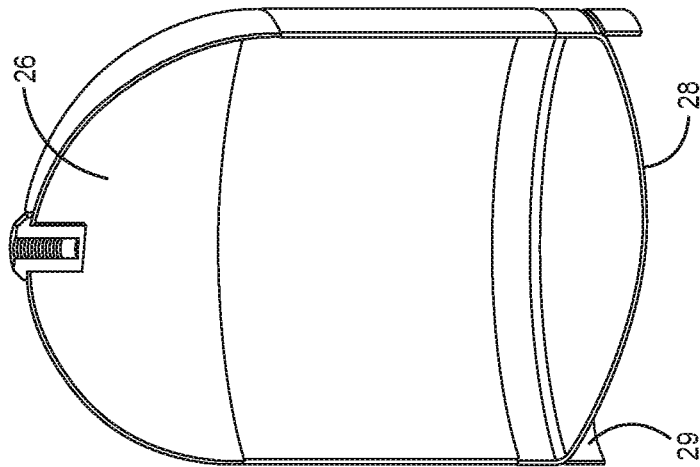
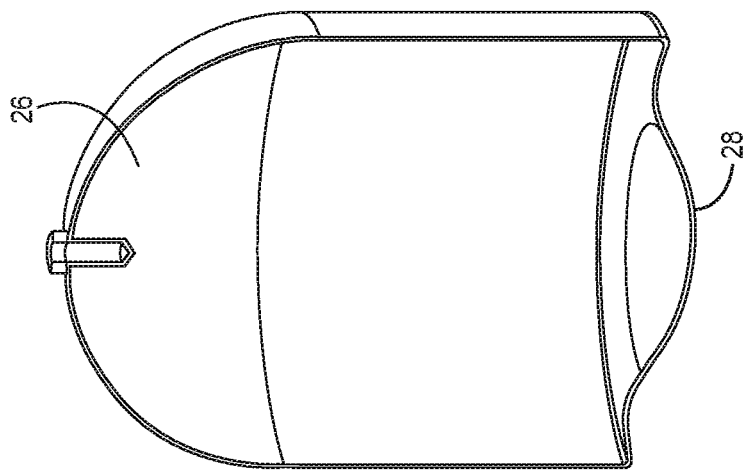

COMBINATION AIR VALVE

This application claims the benefit of U.S. Provisional Application No. 62/348,434, filed Jun. 10, 2016, the contents of which are herein incorporated by reference.

FIELD OF THE INVENTION

The present application is directed to valves, in particular to air release valves for use in pipelines and similar media handling systems.

BACKGROUND OF THE INVENTION

Pipelines, and similar media handling and conveying systems, often accumulate air within them. The air can accumulate, for example, from bubbles within the media being conveyed (as used herein, media refers to a liquid that may contain solid or semi-solid material), by gasses that vent from the media, or during filling and emptying cycles of the pipeline.

It is often desirable to remove the accumulated air from the pipelines, and air release valves have been developed for this purpose. Traditional air release valves use the buoyancy of a float to close the valve. However, such designs suffer from a number of shortcomings, including the problem that each air release valve must be customized for different uses because of the varying pressures, flow rates, etc. that are observed along a pipeline. Further, existing air release valves often have limited pressure ranges, and cannot operate at the wide range of pressures that are sometimes experienced in pipelines. Specifically, higher pressure air release valves often require excessively large floats in order to provide sufficient buoyancy to overcome internal forces, such as extrusion forces along o-rings or against the orifice seal in the venting mechanism. In the alternative, mechanical linkages can be deployed to provide a mechanical advantage to overcome the forces, such as extrusion forces. Unfortunately, the use of a linkage in air release valves often results in increasing the number and types of wear and failure locations, resulting in a potentially less reliable valve that is also more expensive to maintain.

Therefore, a need exists for an improved air release valve, in particular an air release valve with broad operating pressures, including high operating pressures.

SUMMARY OF THE INVENTION

The present disclosure is directed to air release valves that use buoyancy to lift seals into place, allowing accumulated air to be released while also preventing media from escaping from the valve. A combination air valve can vent small volumes of air during normal operation (air release valve) and allow large volumes of air to exit or enter the system as it is filled or drained (air/vacuum valve). Alternatively, the combination air valve can be configured to be only an air release valve. The air release valves may be combination or non-combination air valves.

In certain embodiments the air release valve includes a piston assembly having a main disc, a piston head located above the main disc, a float below the main disc, and a float shaft joining the float to the piston. When no media is in the valve, the float is at the bottom of the valve and the main disc is in a down position. Having the main disc in the down position allows for gases to readily leave the valve through a top opening. As media enters the valve the float rises and the main disc is lifted into place to form a seal. Thus, the valve uses buoyancy to lift the main disc into place, preventing media from escaping from the valve. Once the seal from the main disc is in place, pipeline pressure is used to open and close the valve by means of additional seals that are activated by changes in air volume and media levels within the valve housing to allow exchange of smaller air volumes.

The application is directed, in part, to a venting valve for releasing gases entrapped within the valve, the venting valve comprising a housing having a lower opening for the entry of media and gases, and an upper opening for the exit of gases. A float is located within the housing. The float is in mechanical communication with a first sealing member and a second sealing member. The first sealing member is configured to seal a larger opening than the second sealing member (as used herein, the first sealing member is typically a "main disc", while the second sealing member is a "bottom seal"). Upon filling the housing with a gas or a gas and media mixture, at least a portion of the gases within the valve housing can vent past the open first sealing member and out the upper opening of the valve. This venting can continue until media enters the bottom of the valve sufficient to result in the float becoming adequately buoyant to cause the first and second sealing members to seal. The sealing of the first and second sealing members (and in particular the larger first sealing member) substantially or completely stops further venting of gases. The float descends as media is replaced by gases when additional gases accumulate within the housing (such as from bubbles being released from media in a pipeline or volatilization of media components). The second sealing member opens in response to the descent of the float, while the first sealing member remains closed.

In certain embodiments, the float is connected to a shaft, the shaft penetrating through the first sealing member and second sealing member. Typically, the first sealing member and second sealing member are aligned upon a common axis. This shaft can terminate in a top member that is open to the exterior of the valve. Alternatively, this shaft can terminate in a sealed top cap. When a sealed top cap is used, the shaft can be at least partially hollow (or otherwise contain a conduit) to allow for an equalization of pressure at an upper and lower portion of the shaft so as to equalize extrusion pressures on the shaft, permitting improved operation at high pressure differentials between the interior of the venting valve and exterior atmosphere.

The venting valve can also further include a piston. The piston is configured to build air pressure upon accumulation of gases within the housing when the first and second sealing members are closed. Upon building of adequate pressure within the piston the second sealing member (such as the bottom seal) is opened to allow further release of gases from the valve. In various implementations, the venting valve further comprises a low-flow vent, the low flow vent in communication with the piston.

In certain embodiments the second seal (such as a bottom seal) is surrounded by a protective flange configured to reduce the exposure of the seal to media. The valve housing also optionally contains a downward flange located near the top of the float. This downward flange reduces the amount of media that can extend into the upper portions of the valve, which helps prevent fouling of the components. In some implementations, the downward flange has an inner diameter substantially equal to the outer diameter of the float. In certain embodiments the downward flange has an inner diameter that is within 110 percent of the outer diameter of the float. Typically the downward flange has an inner diameter that is within 120 percent of the diameter of the outer diameter of the float, alternatively within 150 percent of the diameter of the outer diameter of the float.

Generally the first sealing member (for example, a main disc) is configured to seal an opening larger than the opening sealed by the second sealing member (for example, the bottom seal). Also, typically the second sealing member is configured to fit over an opening or orifice within the first sealing member (or main disc). Thus the first sealing member is often a rigid disc, with a seal around its edges, and the second sealing member is a smaller seal that opens and closes around an opening with the first sealing member.

Generally, the first sealing member is configured to seal an opening that is at least 50 percent larger than the opening sealed by the second sealing member. Alternatively, the first sealing member is configured to seal an opening at least 100 percent larger than the opening sealed by the second sealing member; alternatively, the first sealing member is configured to seal an opening at least 200 percent larger than the opening sealed by the second sealing member; and alternatively the first sealing member is configured to seal an opening at least 500 percent larger than the opening sealed by the second sealing member.

The float shaft is in some cases solid, while in other cases hollow. Also, the float shaft can terminate such that it is open to the exterior, or can terminate in an enclosed sealing cap. When the float shaft terminates in a sealed cap the shaft typically has a vent path leading from the main body of the valve to allow equal pressure on both sides of the float shaft, which reduces extrusion forces caused by internal pressures. The reduction or elimination of these extrusion forces allows for a valve that can be operated without linkages or other mechanical advantage at higher pressure. In certain embodiments the venting valve has a float shaft with a variable diameter, and the variations in diameter can be used to close and open seals around the float shaft, in particular around the upper end of the float shaft. In some embodiments the float shaft has at least two sealing surfaces. The float shaft can have variable diameters configured to provide seals along the shaft. Also, by varying the diameter of these seals it is possible to further control extrusion forces on the shaft. In particular an upper seal can have a different diameter than a lower seal to account for and counter friction in the system.

The float itself can also have a downward projecting flange around its lower perimeter, and this flange helps direct media (typically a liquid, or a liquid with solids entrapped in it) back away from the side of the float. The float can also have a convex lower surface that directs media sideways, thereby buffering the up and down motion of the float.

The above summary of the present invention is not intended to describe each discussed embodiment of the present invention. This is the purpose of the figures and the detailed description that follow.

FIGURES

The invention may be more completely understood in consideration of the following detailed description of various embodiments of the invention in connection with the accompanying drawings in which.

Figure 6A:
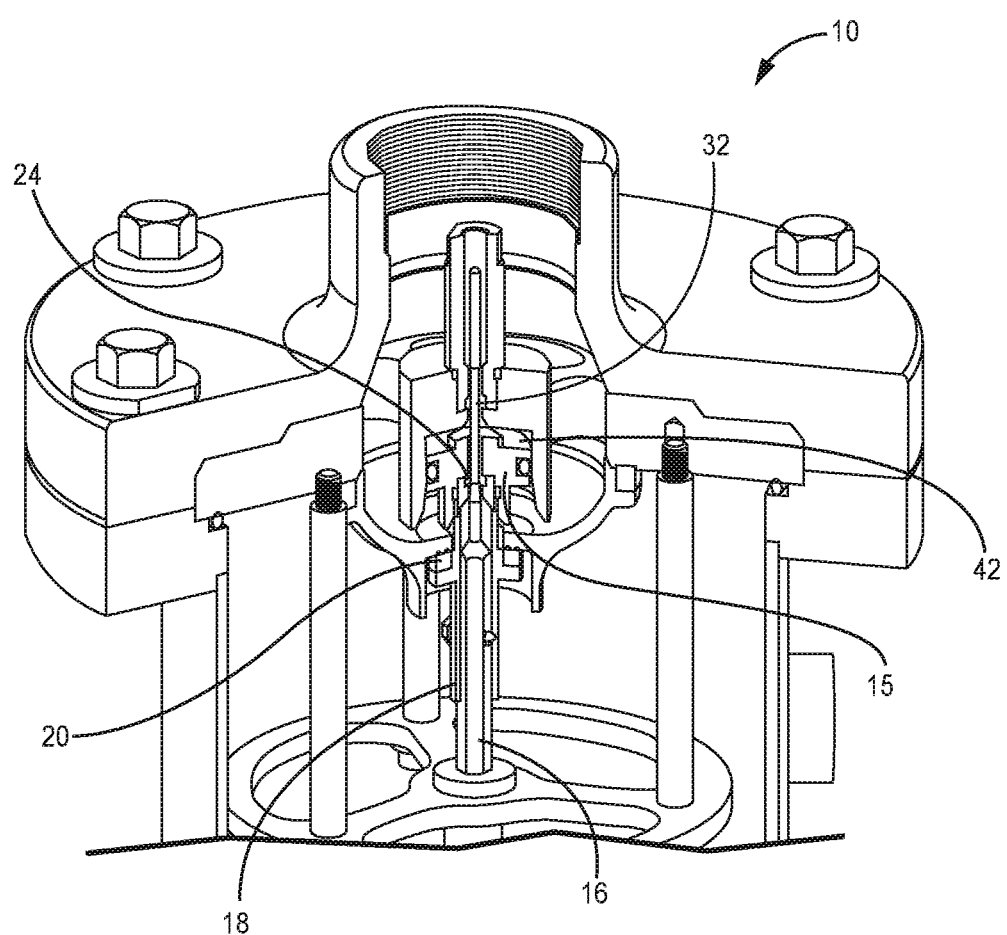
FIG. 6A shows a close up perspective view of upper portions of the venting valve of FIG. 5.
Figure 6B:
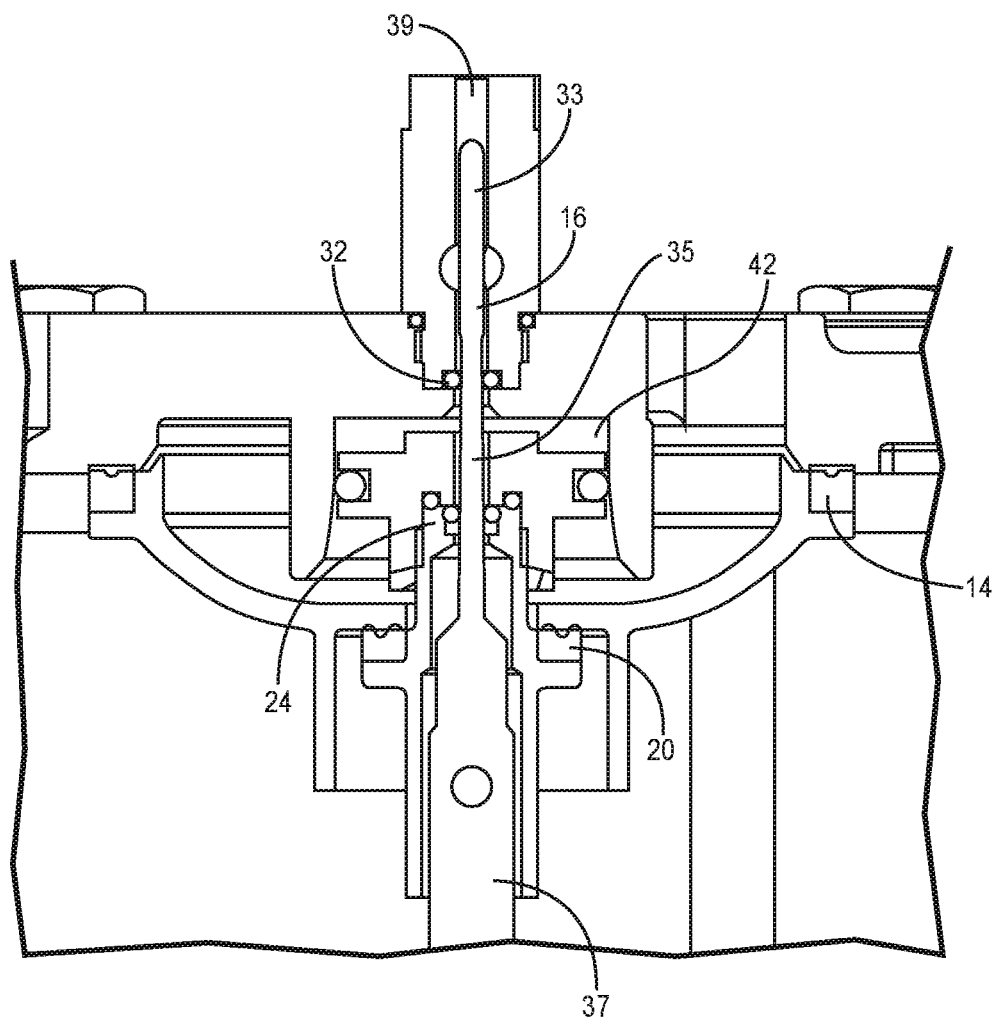
FIG. 6B shows a partial cross section of an upper portion of a venting valve made in accordance with the implementation of the invention shown in FIG. 6A, showing a solid float shaft and open cap.
Figure 6C:
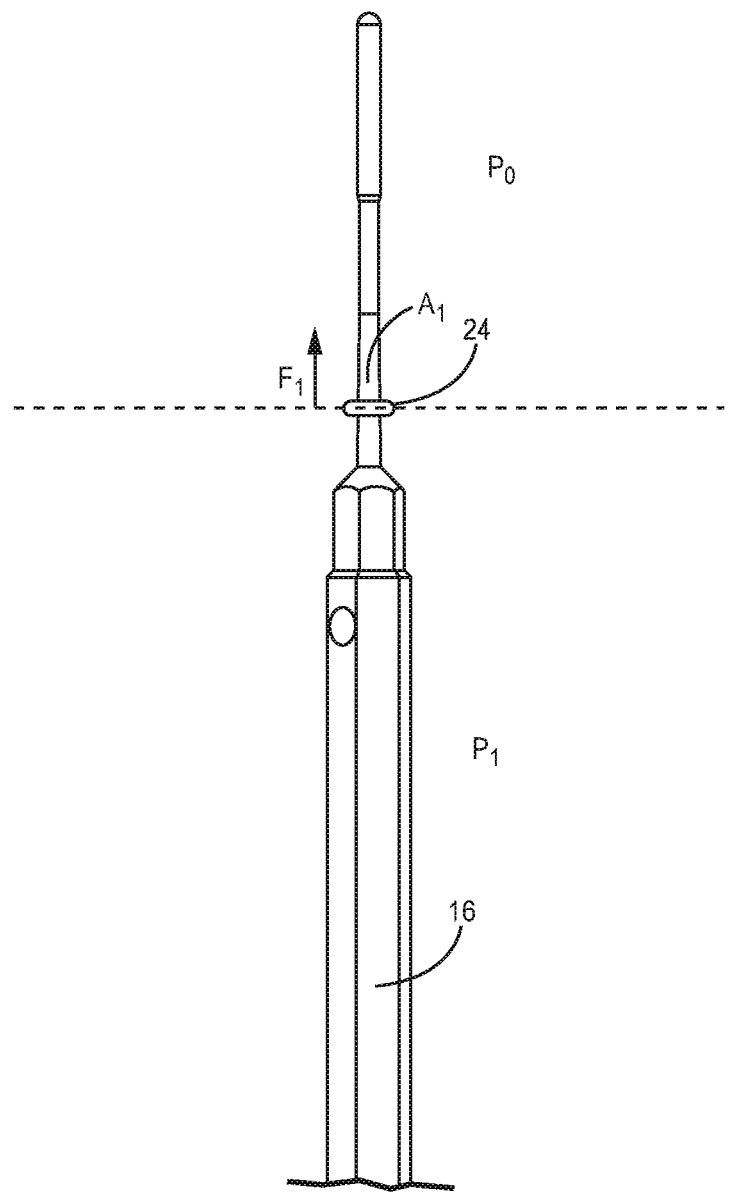
FIG. 6C shows the float shaft of FIGS. 6A and 6B, with a depiction of extrusion forces on the float shaft when the shaft is in a valve with an open cap, and gases are accumulating such that the interior gas pressure is greater than the exterior gas pressure.
Figure 6D:
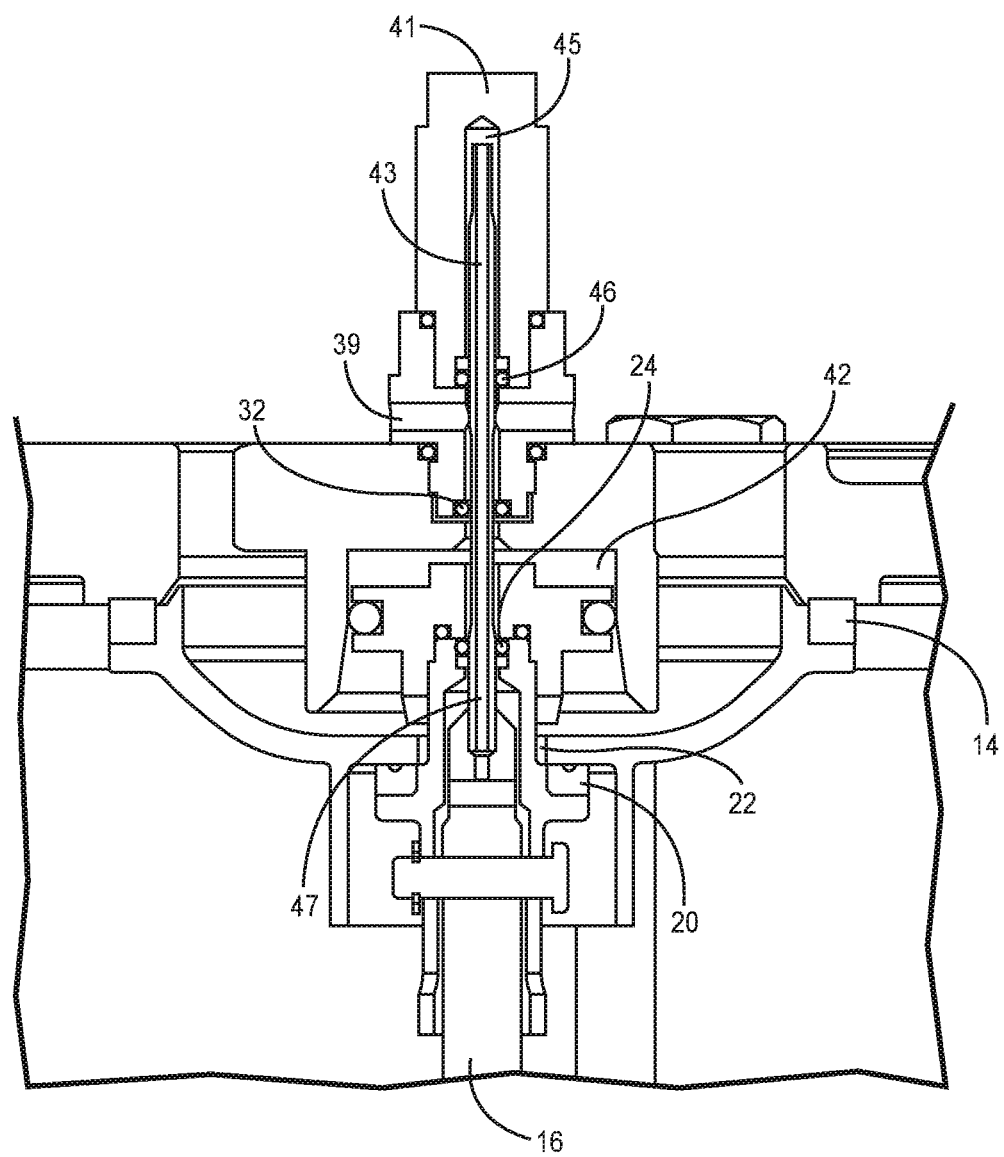
FIG. 6D shows a partial cross section of an upper portion of a venting valve made in accordance with an implementation of the invention, showing a hollow float shaft and sealed cap.
Figure 6E:
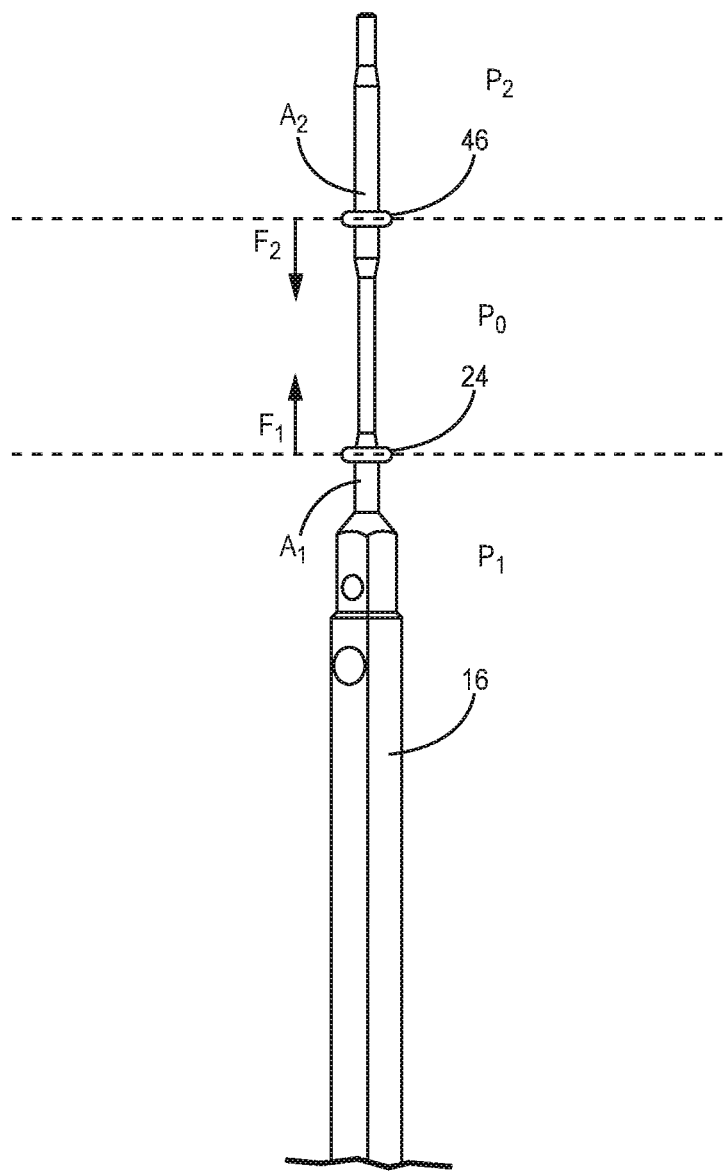
Figure 6F:
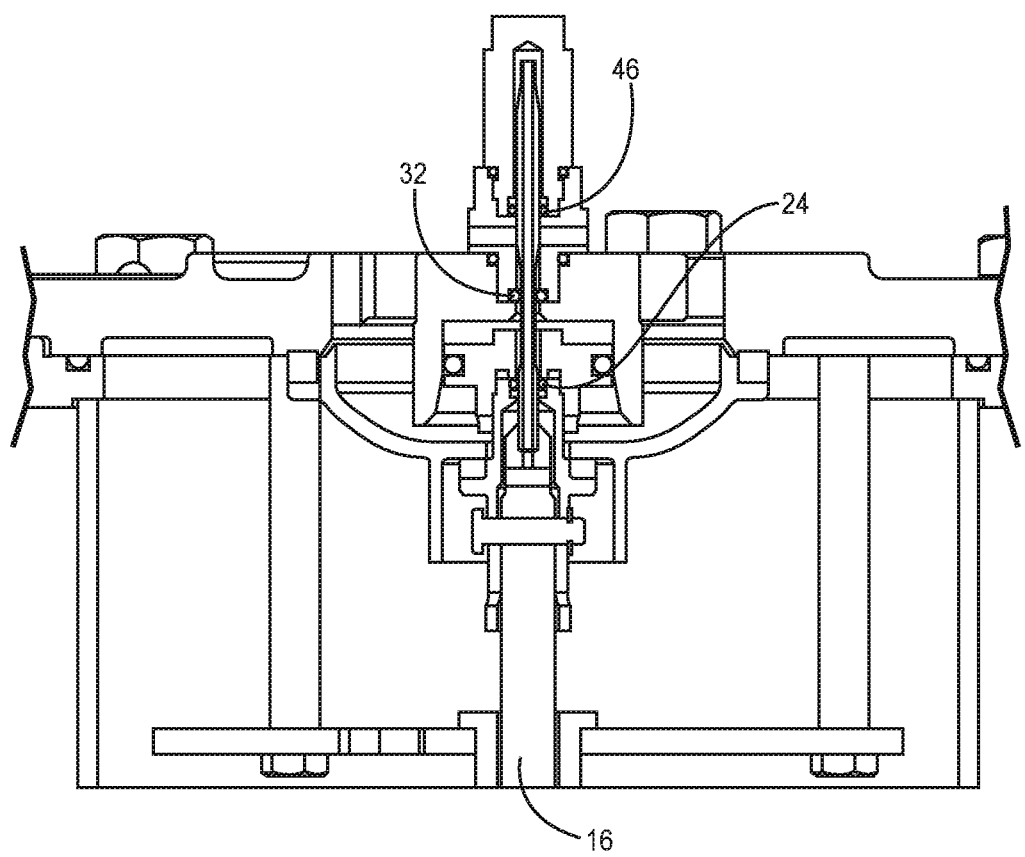

FIG. 6E shows the float shaft of FIG. 6D, with a depiction of extrusion forces on the float shaft when the shaft is in a valve with a sealed cap, and gases are accumulating such that the interior gas pressure is greater than the exterior gas pressure FIG. 6F shows a partial cross section of an upper portion of a venting valve made in accordance with an implementation of the invention, showing a hollow float shaft and sealed cap.

Figure 6G:
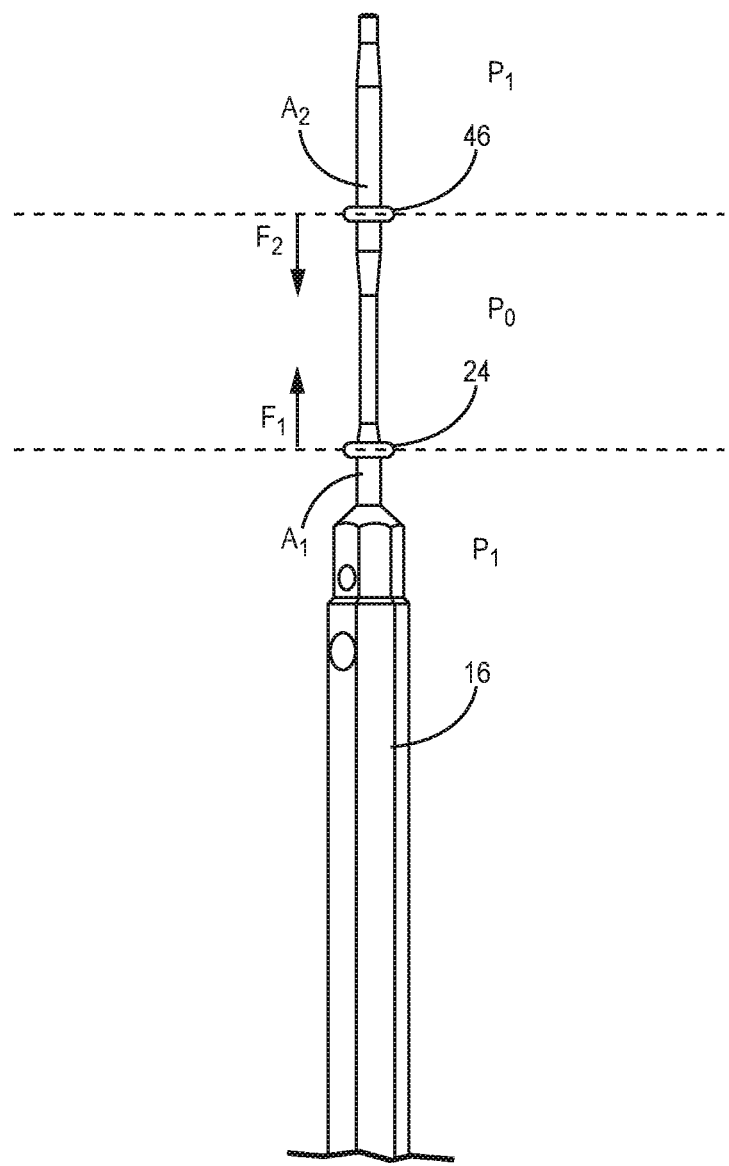

FIG. 6G shows the float shaft of FIG. 6F, with a depiction of extrusion forces on the float shaft when the shaft is in a valve with a sealed cap, and gases are accumulating such that the interior gas pressure is greater than the exterior gas pressure.

Figure 7:
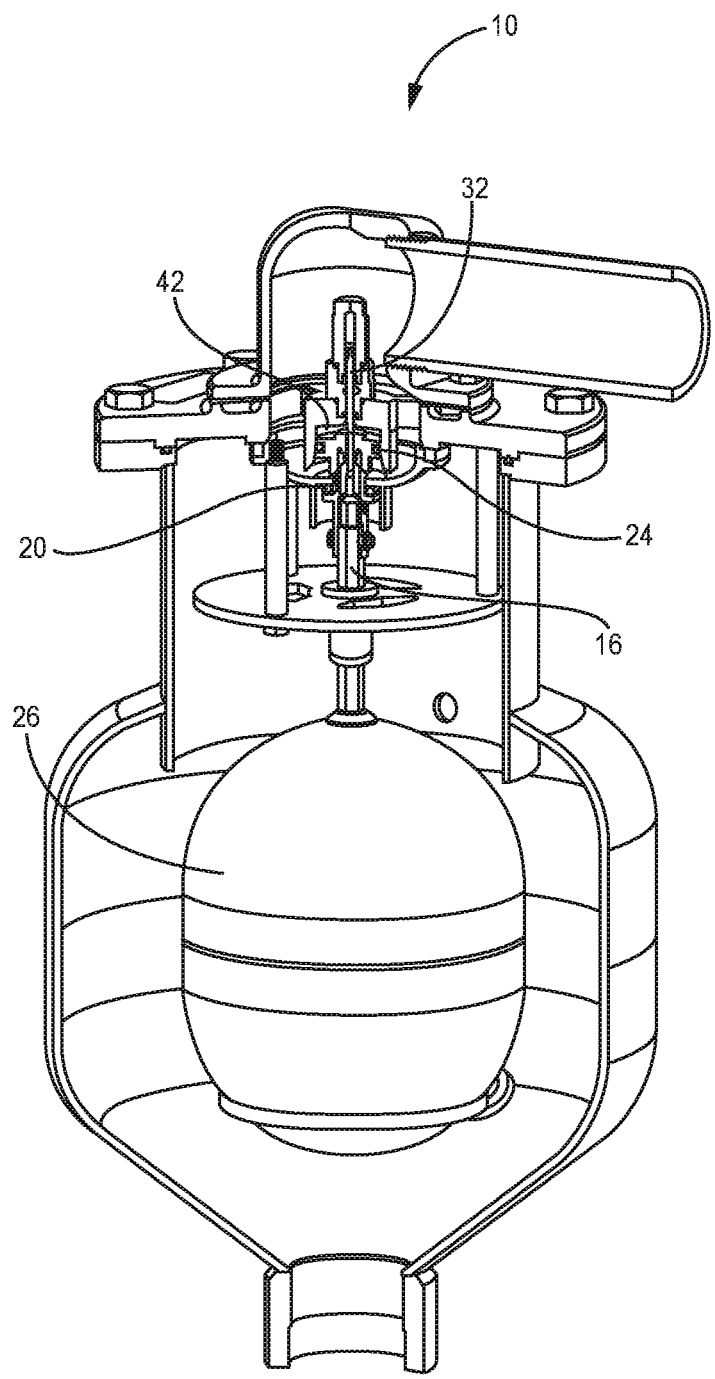

FIG. 7 shows a cross section of a venting valve with a sealed cap, made in accordance with an implementation of the invention, the valve shown with accumulating gases escaping past the bottom seal.

Figure 8:
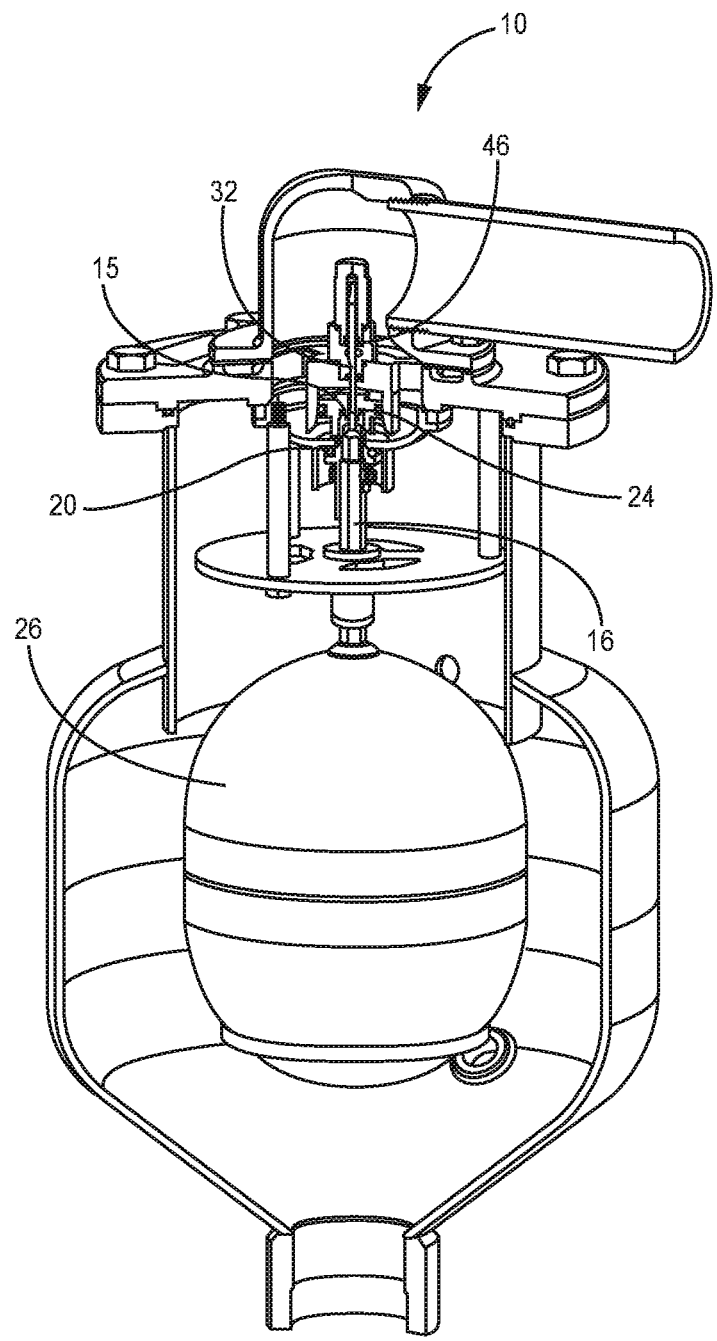

FIG. 8 shows a cross section of a venting valve made in accordance with an implementation of the invention, with the piston pressure orifice closing.

FIG. 9A shows a first float design.

FIG. 9B shows a second float design.

FIG. 9C shows a third float design.

The invention will now be understood by review of the following detailed description.

DETAILED DESCRIPTION

The present invention is directed to an air release valve. In certain embodiments the air release valve includes a piston assembly having a main disc, a piston head located above the main disc, a float below the main disc, and a float shaft joining the float to the piston. The float shaft contains, in some configurations, a hollow interior allowing gases to flow from an upper to lower portion of the float shaft to equalize pressure around sealing elements on the float shaft. This pressure equalization is such that extrusion forces on the float shaft can be significantly reduced, if not eliminated, thereby allowing improved performance at high pressures as well as at greater pressure differentials between the interior and exterior of the valve.

When no media is in the valve, the float is at the bottom of the valve body and the main disc is in a down position. Having the main disc in the down position allows for gases to readily leave the valve through a top opening. As media enters the valve the float is lifted and the main disc is simultaneously lifted into place to form a seal. Thus, the valve uses buoyancy to lift the main disc into place, preventing media from escaping from the valve. Once the main disc seal is in place, pipeline pressure is used to open and close the valve by means of additional seals that are activated by changes in air volume and media levels within the valve housing.

The invention is directed, in part, to a venting valve for releasing gases entrapped within the valve, the venting valve comprising a housing having a lower opening for the entry of media and gases, and an upper opening for exit of gases. A float is located within the housing. The float is in mechanical communication with a first sealing member, and a second sealing member. The first sealing member is configured to seal a larger opening than the second sealing member (as used herein, the first sealing member is typically a "main disc", while the second sealing member is a "bottom seal".

Upon filling the housing with a gas or gas and media mixture, at least a portion of the gases within the valve housing can vent past the open first sealing member and out the upper opening of the valve. This venting can continue until media enters the bottom of the valve in a sufficient volume to result in the float becoming adequately buoyant to cause the first and second sealing members to seal. The sealing of the first and second sealing members (and in particular the first sealing member) substantially or completely stops further venting of gases.

When additional gases accumulate within the housing (such as from bubbles being released from media in a pipeline), the float descends as media is replaced by gases. The second sealing member opens in response to the descent of the float, while the first sealing member remains closed.

In certain embodiments, the float is connected to a shaft, the shaft penetrating through the first sealing member and second sealing member. Typically, the first sealing member and second sealing member are aligned upon a common axis.

The venting valve can also further include a piston. The piston is configured to build air pressure upon accumulation of gases within the housing when the first and second sealing members are closed. Upon the building of adequate pressure within the piston the second sealing member (such as the bottom seal) is opened to allow release of gases from the valve. In various implementations the venting valve further comprises a low-flow vent, the low flow vent in communication with the piston.

In certain embodiments the second seal (such as a bottom seal) is surrounded by a protective flange configured to reduce the exposure of the seal to media. The valve housing also optionally contains a downward flange located near the top of the float. This downward flange reduces the amount of media that can extend into the upper portions of the valve, which helps prevent fouling of the components. In some implementations the downward flange has an inner diameter substantially equal to the outer diameter of the float. In certain embodiments the downward flange has an inner diameter that is within 110 percent of the outer diameter of the float. Typically the downward flange has an inner diameter that is within 120 percent of the outer diameter of the float, alternatively within 150 percent of the outer diameter of the float.

Generally the first sealing member (for example, a main disc) is configured to seal an opening larger than the opening sealed by the second sealing member (for example, the bottom seal). Also, typically the second sealing member is configured to fit over an opening or orifice within the first sealing member (or main disc). Thus the first sealing member is often a rigid disc, with a seal around its edges, and the second sealing member is a smaller seal that opens and closes around an opening in the first sealing member.

Generally the first sealing member is configured to seal an opening at least 50 percent larger than the opening sealed by the second sealing member. Alternatively, the first sealing member is configured to seal an opening at least 100 percent larger than the opening sealed by the second sealing member; alternatively the first sealing member is configured to seal an opening at least 200 percent larger than the opening sealed by the second sealing member; and alternatively the first sealing member is configured to seal an opening at least 500 percent larger than the opening sealed by the second sealing member.

In certain embodiments the venting valve has a float shaft with a variable diameter, and the variations in diameter can be used to close and open seals around the float shaft, in particular around the upper end of the float shaft. In some embodiments the float shaft has at least two sealing surfaces. The float shaft can have variable diameters configured to provide seals along the shaft.

The float shaft is in some cases solid, while in other cases hollow. Also, the float shaft can terminate such that it is open to the exterior, or can terminate in an enclosed sealing cap. When the float shaft terminates in a sealed cap the shaft typically has a vent path leading from the main body of the valve to allow equal pressure on both sides of the float shaft, which reduces extrusion forces caused by internal pressures. The reduction or elimination of these extrusion forces allows for a valve that can be operated without linkages or other mechanical advantage at higher pressure.

The float itself can also have a downward projecting flange around its lower perimeter, and this flange helps direct media (typically a liquid, or a liquid with solids entrapped in it) back away from the side of the float. The float can also have a convex lower surface that directs media sideways, thereby buffering the up and down motion of the float.

Figure 1:
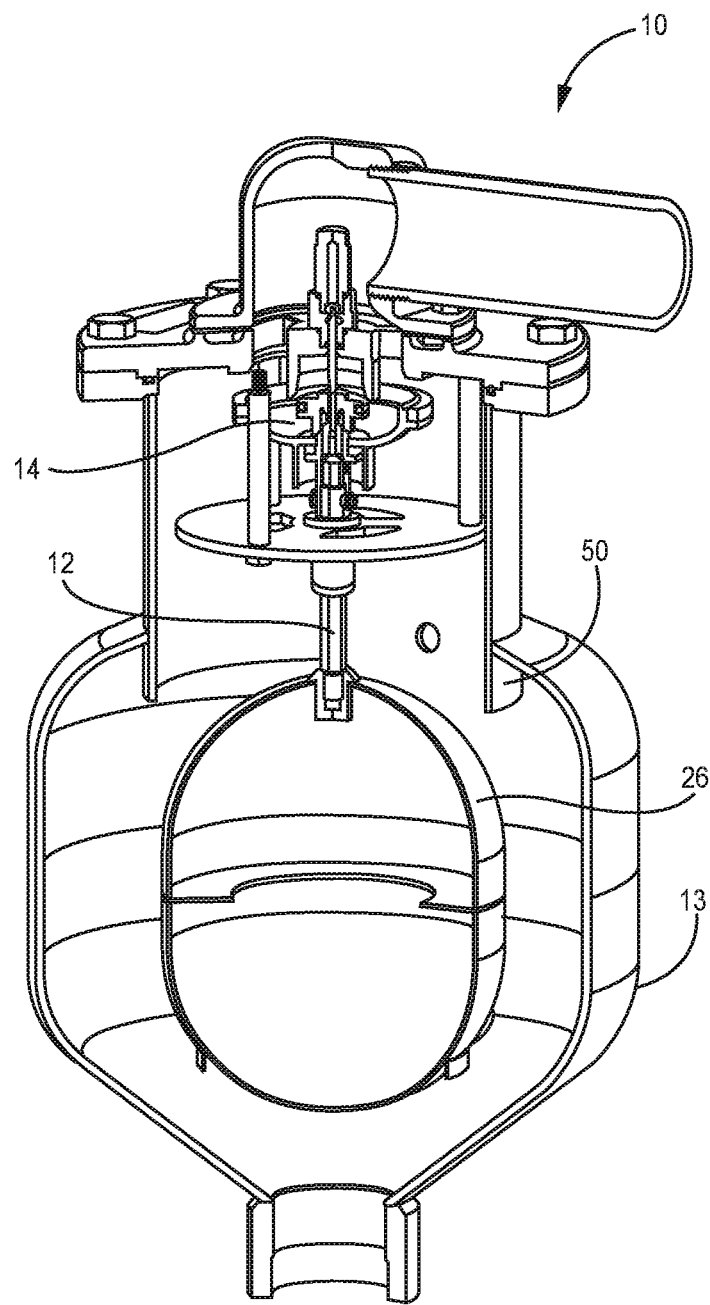
FIG. 1 shows a cross section of a venting valve made in accordance with a first implementation of the invention, the venting valve shown in an open position with no media or gas in the vessel.

Now, in reference to the drawings, FIG. 1 shows a cross section of a venting valve 10 made in accordance with a first implementation of the invention. The valve 10 is shown in an open position with no media or gas in the valve. The main disc 14 is down, opening the valve 10 to the atmosphere. The valve 10 includes a piston assembly 12 at the bottom of which is located a float 26. The piston assembly 12 and float 26 are contained within valve housing 13. Inside the valve is a flange 50 projecting down into the lower portion of the housing, the flange providing protection from media splashing up into the top of the valve 10. Media can still flow around the flange, but splashing is reduced. This downward flange reduces the amount of media that can extend into the upper portions of the valve, which helps prevent fouling of the components. In some implementations the downward flange has an inner diameter substantially equal to the outer diameter of the float. In certain embodiments the downward flange has an inner diameter that is within 110 percent of the diameter of the outer diameter of the float. Typically the downward flange has an inner diameter that is within 120 percent of the diameter of the outer diameter of the float, alternatively within 150 percent of the outer diameter of the float.

Figure 2:
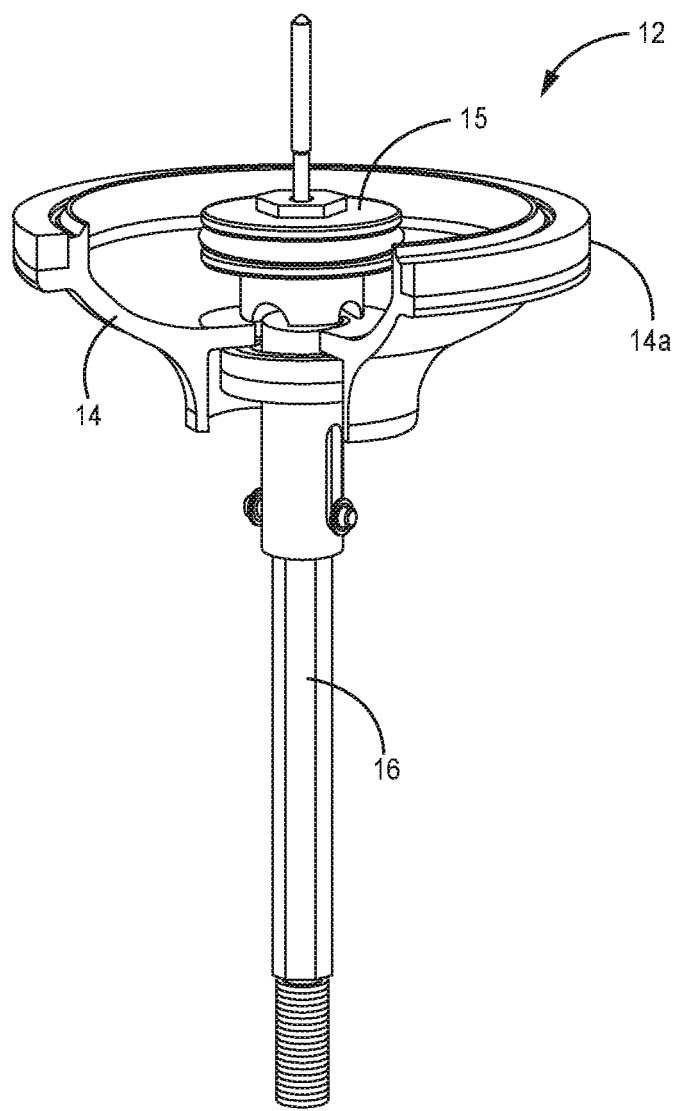
FIG. 2 shows a perspective view of a piston assembly made in accordance with an implementation of the invention, the piston assembly removed from a valve.

The piston assembly 12 is shown in greater detail in FIG. 2, which shows a perspective view of the piston assembly 12 made in accordance with an implementation of the invention. The piston assembly 12 of FIG. 2 is removed from the valve housing. The piston assembly 12 includes a main disc 14 with a perimeter seal 14a, a piston head 15 (with a perimeter o-ring seal in the depicted embodiment), and a float shaft 16. The float shaft 16 can be constructed with flat sides, such as having a hexagonal or octagonal cross section. The bottom of the float shaft 16 can include threads for securing a float. The upper part of the float shaft 16 can include a variable diameter shaft, such as shown in FIG. 3.

Figure 3:
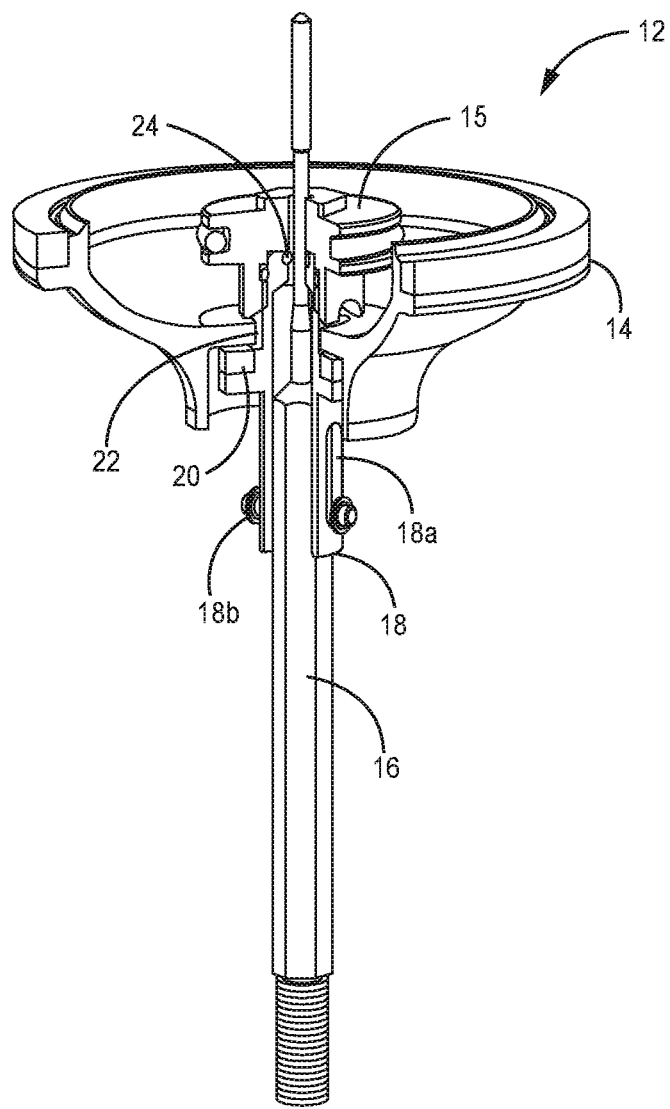
FIG. 3 shows a cross sectional partial view of the piston assembly of FIG. 2.

FIG. 3 shows a cross sectional partial view of the piston assembly 12 of FIG. 2, showing the piston assembly 12 with a main disc 14, a piston head 15, float shaft 16, a piston assembly tube 18, a bottom seal 20, a bottom seal orifice 22, and a piston pressure orifice 24. The float shaft 16 is able to travel a limited distance up and down along the main disc 14, controlled by a slot 18a and pin 18b. As will be described more fully below, the movement of components of the valve piston assembly 12 with respect to one another permits for flow and release of entrapped gases. The movement of the valve piston assembly 12 (including the main disc) also permits selective release of entrapped gases (as described further below).

Figure 4:
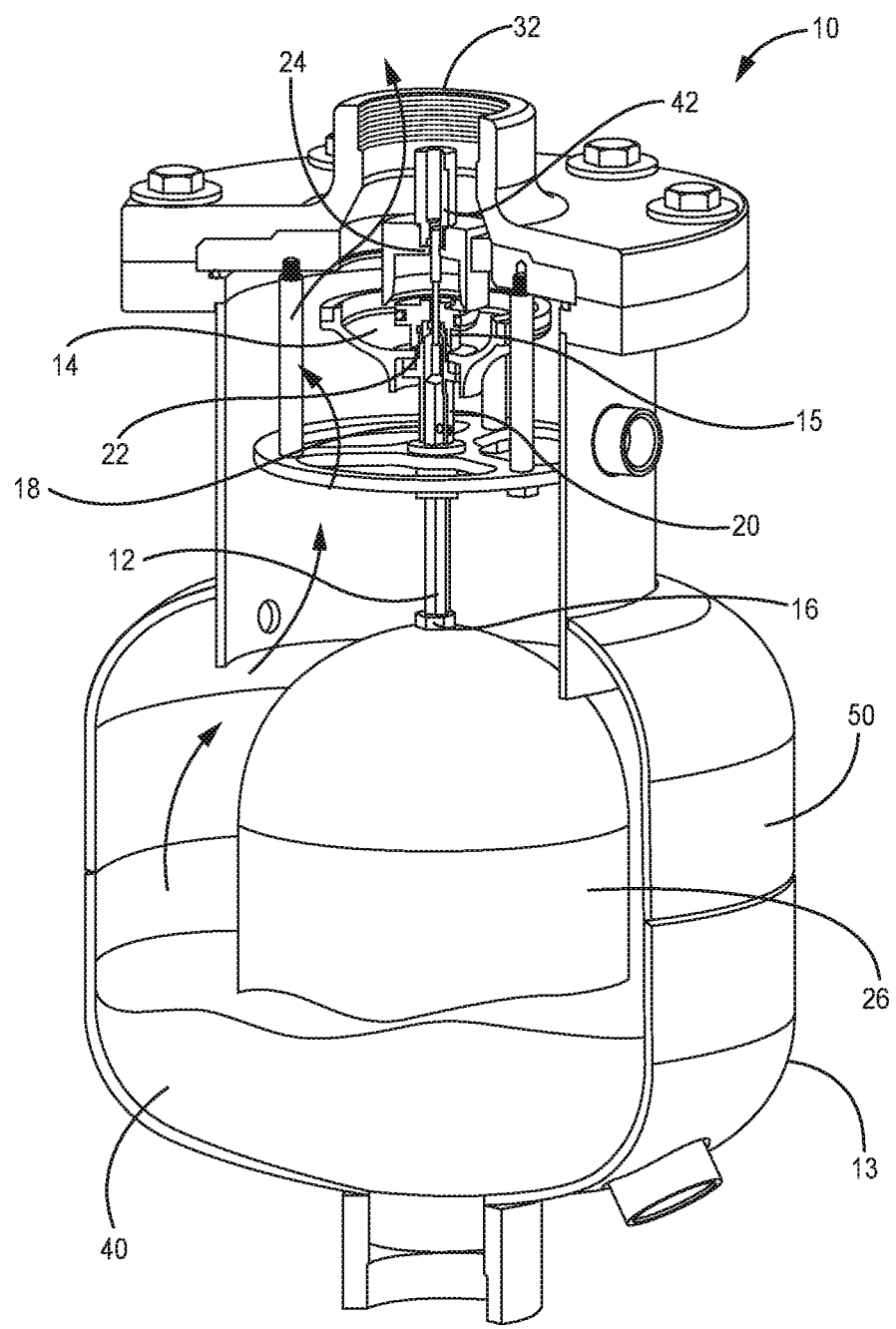
FIG. 4 shows a cross section of a venting valve made in accordance with an implementation of the invention, the valve shown with media having begun to enter through the bottom of the valve.

FIG. 4 shows a cross section of the venting valve 10, showing the piston assembly 12 within the valve 10. The valve 10 is shown with media 40 having started to enter through the bottom of the valve 10, such as when a pipeline is being filled. The float 26 is still positioned at the bottom of the housing 13, but becomes more and more buoyant as the media 40 enters the housing 13. Gases are able to escape out through the top of the valve 10 by passing around the main disc 14 and out of the valve, as shown by the arrows.

As media continues to enter the valve housing 13, the media level rises and gases escape from the top of the valve 10. The float 26 also gradually rises. As the media level rises further the main disc 14 rises together with it. Eventually the media lifts the float 26 and it pushes main disc 14 into a closed position, resulting in trapping gases within the valve 10. If gases continue to accumulate, or media enters the valve, it creates an elevated pressure of gas within the top portion of the valve housing 13. The elevated pressure holds the main disc 14 and the bottom seal 20 in place during operation. Further gas is not able to escape because the main disc 14 and bottom seal 20 prevent gases from escaping.

When new gases accumulate inside the valve body the level of media 40 drops within the housing 13 because the gases displace the media 40, and pressure also typically increases within the housing 13. The float and float shaft follow the media level down as it is displaced by gas/air. This movement down of the float and float shaft 16 can result in opening of the piston pressure orifice 24 (see FIG. 3 as well). Once the piston pressure orifice 24 is open, gases flow in a gap between the float shaft 16 and the piston assembly tube 18. The gases then pass through the low flow vent 32 and finally to the atmosphere. If the rate of gases entering the vent valve 10 surpasses the rate of gases leaving the low flow vent 32, the gases will accumulate in the housing 13 and the float 26 and float shaft 16 will drop to a lower position. The lower position will close the low flow vent 32, trapping the gas in the piston cylinder 42. As the gas continues to flow into the piston cylinder 42, it can overcome the force on the bottom seal 20 (also see FIG. 3) opening the bottom seal orifice 22 (also see FIG. 3) allowing gas to vent to atmosphere.

Figure 5:
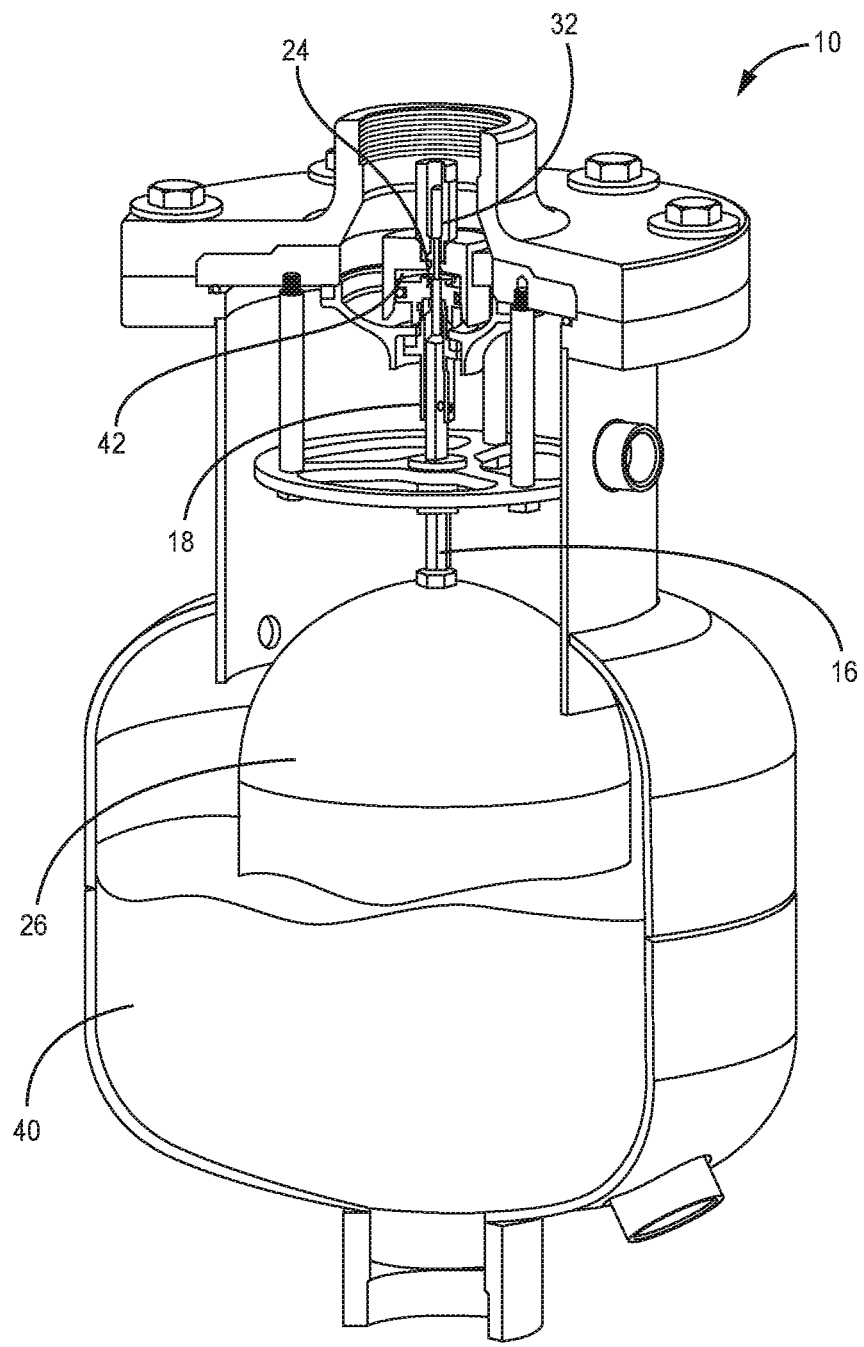
FIG. 5 shows a cross section of a venting valve made in accordance with an implementation of the invention, the valve shown with media having lifted the float within the valve, with the float starting to descend slightly to allow low flow vent to release gases.

FIG. 5 shows a cross section of a venting valve 10 with media 40 having lifted the float 26 within the valve, but with accumulating air in the housing displacing the media 40. As the media 40 accumulates the float rises, with gas venting out into the atmosphere.

Referring now to FIGS. 6A to 6G, three venting configurations are shown, including various constructions for small amounts of gases near the top of the vent valve by way of a low flow vent. In particular, various configurations for the float shaft 16 and related seals are disclosed, including constructions with closed and open caps. FIG. 6A shows a close up of a portion of FIG. 5, depicting a first configuration for a low flow vent. The float (not shown) and float shaft 16 follow the media level down as it is displaced by gas/air. This movement down of the float and float shaft 16 can open the piston pressure orifice 24. Once the piston pressure orifice 24 is open, gases flow between the float shaft 16 and the piston assembly tube 18, pass through the piston cylinder 42, through the low flow vent 32, and finally to the atmosphere through an open top. If the rate of gases entering the vent valve 10 surpasses the rate of gases leaving the low flow vent 32, the float 26 will drop to a lower position as gases accumulate and media is displaced from the vent valve 10. The lower position of the float and float shaft 16 will close the low flow vent 32 as the wider upper portion of the float shaft 16 descends to engage the seal on the low flow vent 32. This closing of the low flow vent 32 results in trapping previously-escaping gas and an increase in pressure in the piston cylinder 42. As the pressure increases in the piston cylinder 42, it can overcome the force on the bottom seal 20 opening the bottom seal orifice 22 (also see FIG. 3) allowing gas to vent to atmosphere, as described below with regard to FIG. 7.

The embodiment from FIG. 6A is shown again in FIG. 6B in cross section. The low flow vent 32 and piston pressure orifice 24 opens and closes as the upper portion 33 and intermediate portion 35 of the float shaft 16 move along an o-ring at the low flow vent 32 and piston pressure orifice 24. As depicted the float shaft 16 is elevated sufficiently such that the narrow portion intermediate portion 35 of the float shaft 16 is adjacent to the low flow vent 32 (specially, a portion of the float shaft 16 that is narrower than the opening of the low flow vent 32 is in alignment with the low flow vent 32 seal). When the piston pressure orifice 24 is open, gases flow in a gap between the float shaft 16 and the piston assembly tube 18 (see FIG. 3). The gases then pass through the low flow vent 32 and finally to the atmosphere.

If the rate of gases entering the vent valve 10 surpasses the rate of gases leaving the low flow vent 32, the float 26 will drop to a lower position as gases accumulate in the valve. The lowering of the float will result in closure of the low flow vent 32 as the wider upper portion 33 of the float shaft 16 descends and seals at low flow vent 32. The sealing of the upper portion 33 of the float shaft 16 with the seal (typically an o-ring) at the low flow vent 32 results in the trapping of the remaining gas in the piston cylinder 42. As the gas continues to flow into the piston cylinder 42 pressure increases such that it can overcome the force on the bottom seal 20 opening the bottom seal orifice 22 allowing gas to vent to the atmosphere.

This construction shown in FIGS. 6A and 6B has a float shaft 16 having a variable diameter. An upper portion 33 of the float shaft 16 has a wider diameter than an intermediate portion 35, followed by a wider portion 37. Portion 37 is typically wider than portion 33, but in some implementations is the same diameter or thinner than portion 33. These differences in diameter, in conjunction with different diameters of various seals, provides for further control of the escape of air from the valve in response to movement of the float shaft 16. Thus, in this manner the venting valve of FIGS. 6A and 6B allow for the venting of air into the atmosphere by way of a process whereby increasing gas accumulation within the valve results in a lowering of the media levels and a concurrent lowering of the float assembly, this causes the float shaft 16 to descent sufficiently to form a seal at low flow vent 32 that prevents the slow bleeding of gases out the opening 39. The entrapped gases then accumulate in the piston cylinder 42 above the bottom seal 20, which is subsequently pushed downward as gases accumulate in the piston cylinder 42 to release the gases.

Referring now to FIG. 6C, the float shaft 16 from FIGS. 6A and 6B is illustrated to represent gas pressures along the float shaft 16 as well extrusion forces on the float shaft when the venting valve is accumulating gases, or has accumulated gases. FIG. 6C depicts the gas pressures and extrusion forces present when the venting valve is in an atmospheric pressure of $P_0$ and with an internal system pressure of $P_1$, with $P_1$ being greater than $P_0$. Piston pressure orifice 24, shown with the orifice o-ring, separates the higher system pressure at $P_1$ from the lower atmospheric pressure $P_0$. The result is an upward extrusion force F1 at the piston pressure orifice. This extrusion force F1 is determined in part by the area $A_1$ of the float shaft 16 taken at the piston pressure orifice 24, and can be calculated as the area of the float shaft at that location multiplied by the difference in system pressure $P_1$ and atmospheric pressure $P_0$:

$$F_1 = A_1 \cdot (P_1 - P_0)$$

Thus, the greater the difference between system pressure $P_1$ and atmospheric pressure $P_0$, the greater the extrusion force that is created for any given cross sectional area. In many implementations, the extrusion force is not a problem because $P_1$ and $P_0$ are relatively close in magnitude, or because $A_1$ is relatively small. However, at high pressures the extrusion force can become significant, and it can be necessary to increase the mass of the float so as to counter the extrusion force when the float is descending as gases accumulate. Such increases in the mass of the float means the float must be made larger to still provide buoyancy, resulting in a larger float and larger valve. Thus, the construction shown in FIGS. 6A to 6C is useful, but the utility is reduced at high pressures.

Referring now to FIG. 6D, an alternative construction is shown for the venting valve, in this configuration the interior of the float shaft 16 is hollow along a portion of its length to provide pressure equalization across the top and bottom of the vent valve, thereby equalizing extrusion forces and reducing the size of the necessary float. The construction shown in FIG. 6D differs in part from that shown in FIG. 6A to 6C by way of this hollow float shaft 16 and closed cap 41 and cap pressure seal 46. In this construction, the top and bottom of the float shaft 16 have equalized pressure, which reduces or eliminates extrusion forces that develop in the embodiment of FIGS. 6A to 6C.

The equalization of pressure in the venting valve of FIG. 6D is accomplished by allowing pressure to equalize by way of the hollow conduit 43 leading from the lower portion 47 to the upper portion 45 of the float shaft 16. Unlike the embodiment shown in FIGS. 6A and 6B, where the float shaft 16 is solid, the float shaft 16 of FIG. 6D is hollow. Once the piston pressure orifice 24 is open, gases flow in a gap between the float shaft 16 and the piston assembly tube 18. The gases then pass through the low flow vent 32 and finally to the atmosphere at opening 39. If the rate of gases entering the vent valve 10 surpasses the rate of gases leaving the low flow vent 32, the float 26 will drop to a lower position. The lower position will close the low flow vent 32, trapping the gas in the piston cylinder 42. As the gas continues to flow into the piston cylinder 42, it can overcome the force on the bottom seal 20 opening the bottom seal orifice 22 allowing gas to vent to atmosphere.

The equalization of gases combined with the closed cap 41 and cap pressure seal 46 does not allow direct release of gases through the cap 41. Instead, the pressure is equalized above and below the float shaft, and lowering of the float shaft results in the opening of the piston pressure orifice 24. This equalization of pressures allows the float shaft to move more freely, with significantly reduced net extrusion forces, which allows the valve to operate at much higher range of pressures, and a higher maximum pressure, than a non-equalized construction.

It will be understood, as well, that the equalization of pressures can occur through a conduit that does not run through the float shaft 16. For example, a separate conduit can be constructed in other locations that provide equalization of pressure between the lower portion 47 and upper portion 45 of the float shaft. Such conduits can include, for example, a conduit integrated into the housing 13. This could be an internal tube or pipe, an external tube or pipe, etc.

FIG. 6E shows the various pressures and forces present in the construction of the valve of FIG. 6D. The hollow float shaft 16 allows for equalization of interior pressures above the cap pressure seal 46 and below the piston pressure orifice 24. In addition these two seals have equal cross sectional areas $A_1$ and $A_2$. When $A_1 = A_2$, and $P_1 = P_2$, then $F_1 = F_2$ from the formula force equals area times pressure. Normally and $P_1$ does equal $P_2$ because the hollow float shaft 16 allows for equalization of interior pressures above the cap pressure seal 46 and below the piston pressure orifice 24. Thus, the upward force $F_1$ and downward force $F_2$ offset one another. The resulting net force is zero. The net force acting on float shaft is reduced or eliminated, as a result of the pressure forces from the cap pressure seal 16 and piston pressure seal 24. This equalization of pressures allows the venting valve to operate at a high range of pressures without linkages or other mechanical advantage methods. For example, in certain implementations the construction of FIG. 6D allows for operation at 2 to 300 pounds per square inch of pressure within the valve, while an otherwise identical construction but lacking the pressure equalization may have a maximum pressure differential of half of that or less of construction with pressure equalization. Certain implementations of the construction of FIG. 6D can also operate at higher pressure such as 600 or even 900 pounds per square inch of pressure within the valve.

FIG. 6F shows a cross section of an upper portion of a venting valve made in accordance with an alternative implementation of the invention. A primary difference in this construction is area $A_2$ is greater than area $A_1$. Thus, the uppermost portion of the float shaft 16 that engages cap pressure seal 46 has a greater area than that portion of the float shaft 16 that engages the piston pressure orifice 24, which results in a greater extrusion force since the pressures are equalized to $P_1$. The extrusion forces are shown in FIG. 6G. With area $A_2$ greater than area $A_1$ there is a net downward force on the float shaft. Area $A_2$ may be 10% greater, 25% greater, or optionally 50% greater than area $A_1$. One advantage of having area $A_2$ be greater than area $A_1$ is that there is additional potential to operate the valve at even higher system pressures greater than 300 PSI, such as 600 PSI. In addition, there potential to decreasing the weight and volume of the float. This allows the venting valve to be a more compact package, which is in high demand to the venting valve customers.

FIG. 7 shows a cross section of a venting valve 10, the venting valve 10 shown with accumulating gases escaping past the bottom seal 20 (accumulating media is not shown). Typically the bottom seal 20 will move from 0.010 to 0.100 inches from a closed to open position, more typically from 0.025 to 0.050 inches; and often from 0.030 to 0.040 inches. The distance moved by the bottom seal 20 is controlled by the piston. Greater distances will result in more rapid release of air within the lower portion of the valve, but also result in more rapid and violent entry of media into the lower portion of the valve. Therefore, depending upon the various valve dimensions and the media that will be handled, the movement of the bottom seal can be modified to provide suitable performance. As the gases vent out of the valve, the media 40 level rises, and the piston pressure orifice 24 is closed. FIG. 8 shows the venting valve 10 with the piston pressure orifice 24 closing. Once closed, the resulting force on the piston head 15 is relatively small and pressure from within the valve reseats the bottom seal 20, starting the cycle over.

Typically the size of the piston head 15 is matched to the size of the bottom seal 20 to control opening force, and the piston head 15 is larger in surface area than the bottom seal surface. In this manner the venting valve 10 can be made to work over a broad pressure range, such as less than 5 psi up to 150 psi and in some embodiments as high as 300 psi or more. Furthermore, as pressure on the piston head 15 pushes down, pressure on bottom seal 20 pushes up. Piston head 15 size is preferably larger than the bottom seal 20, allowing for a net downward force when the piston head orifice is open. In some implementations the area sealed by the bottom seal is 10 percent smaller than the area of the piston head; alternatively the bottom seal is 20 percent smaller in surface area than the piston head; alternatively the bottom seal is 30 percent smaller in surface area than the piston head; alternatively the bottom seal is 40 percent smaller in surface area than the piston head; and alternatively the bottom seal is 50 percent smaller in surface area than the piston head. This size difference allows for a single design to operate over different pressure ranges.

Generally the piston and main disc are engineered to control piston travel moving down. The piston travel distance controls the bottom seal orifice venting rate, along with the diameter of the bottom seal. When the piston head moves down the bottom seal is opened. It is possible to have either larger or smaller piston travel distances to impact timing of opening of the bottom seal.

It will also be understood that he low flow vent (formed, for example, by the variable diameter of the top portion of the float shaft 16 as it engages a perimeter seal around the float shaft) is engineered to bleed trapped air when the float shaft is moving up. It will be further noted that the bottom seal orifice is sized to vent the required amount of gas to control distance of media level rise in the vessel during venting. The main disc and vent mechanism are sized to allow full area opening at top of vessel to match media inlet opening at bottom of vessel. This can be done per an industry standard and can ensure gas is allowed to enter and leave the valve quick enough.

The piston pressure orifice is typically located above the pressure chamber, greatly reducing the risk of plugging. The bottom seal is located on the bottom surface of the main disc 14, which is protected from media by a protection ring on the bottom of the main disc. Another protection feature is the media deflection ring or flange on the inside of the valve body. The deflection ring decreases the potential of media from splashing and reaching the components above the float.

FIGS. 9A-9C show several embodiments of the float 26. The float can be configured such that media entering the valve is deflected away from the float 26. The media diffusion can reduce the media velocity and reduce the risk of media getting above the float. The bottom of the float 28, can be designed to increase float lift while deflecting media. The float mass and volume can be optimized to allow the media level during operation to be as low as possible. The bottom of the float 28 can include a concave portion and a convex portion, such as shown in FIG. 9A. The bottom of the float 28 can include a lip, such as an outside diameter of the float extending towards the bottom of the valve (as shown in FIG. 9B with lip 29). The float 26 can include a peak in the middle of the bottom of the float 28, such as shown in FIG. 9C. The float 26 can be hollow (as shown in FIGS. 9A and 9B) or solid (as shown in FIG. 9C).

Generally the piston head seal and pressure chamber are engineered to control piston travel moving down. The piston travel distance controls the bottom seal orifice venting rate, along with the diameter of the bottom seal. The low flow vent is engineered to bleed trapped air when float shaft is moving up. It will be further noted that the bottom seal orifice is sized to vent the required amount of gas to control distance of media level rise in the vessel during venting. The amount of travel by float is engineered to ensure timing and travel matches piston timing and travel.

The main disc and vent mechanism are sized to allow full area opening at top of vessel to match media inlet opening at bottom of vessel. The piston chamber typically includes vent holes to relieve pressure if the piston travels beyond designed travel distance. Typically the piston pressure orifice is located outside the pressure chamber greatly reducing risk of plugging. If the orifice does plug, the valve fails closed to prevent accidental media discharge.—The piston pressure orifice is typically located above the pressure chamber greatly reducing the risk of plugging.

The present invention should not be considered limited to the particular examples described above but rather should be understood to cover all aspects of the invention as fairly set out in the attached claims. Various modifications equivalent processes as well as numerous structures to which the present invention may be applicable will be readily apparent to those of skill in the art to which the present invention is directed upon review of the instant specification.

We claim:

1. A venting valve for releasing gases entrapped within the valve, the venting valve comprising:
   a) a housing having a lower opening for the entry of media and gases, and an upper opening for exit of gases;
   b) a float located within the housing, the float in mechanical communication with a first sealing member and a second sealing member, the mechanical communication provided at least in part by a float shaft, the float shaft moving along an enclosed pathway having substantially equalized pressures at a first end and a second end of the float shaft, but with a lower pressure in between the first and second ends;

wherein upon accumulation of additional gases within the housing the second sealing member opens in response to the descent of the float while the first sealing member remains closed.

2. The venting valve for releasing gases according to claim 1, wherein the shaft is at least partially hollow.

3. The venting valve for releasing gases according to claim 1, further comprising a low-flow vent.

4. The venting valve for releasing gases according to claim 1, wherein the shaft penetrates through [a] the first sealing member and [a] second sealing member.

5. The venting valve for releasing gases according to claim 4, wherein the first sealing member and second sealing member are aligned upon a common axis.

6. The venting valve for releasing gases according to claim 4, further comprising a piston, the piston configured to build air pressure upon accumulation of gases within the housing when the first and second sealing members are closed, wherein upon the building of adequate pressure within the piston the second sealing member is opened to allow further release of gases from the valve.

7. A venting valve for releasing gases entrapped within the valve, the venting valve comprising:
   a) a housing having a lower opening for the entry of media and gases, and an upper opening for exit of gases;
   b) a float located within the housing, the float in mechanical communication provided with a float shaft having a conduit through it;
   wherein the float shaft has a an upper portion and a lower portion maintained at substantially equalized pressures, plus an intermediate portion between the first and second portions, the intermediate portion at a lower pressure than the equalized pressure; and
   wherein the upper portion of the float shaft is located within an enclosure having no opening for gas flow other than through the conduit in the upper portion of the float shaft and out the lower portion float shaft.

8. The venting valve for releasing gases according to claim 7, wherein the shaft is at least partially hollow.

9. The venting valve for releasing gases according to claim 7, further comprising a low-flow vent.

10. The venting valve for releasing gases according to claim 7, wherein the shaft penetrates through a first sealing member and a second sealing member.

11. The venting valve for releasing gases according to claim 10, wherein the first sealing member and second sealing member are aligned upon a common axis.

12. The venting valve for releasing gases according to claim 10, further comprising a piston, the piston configured to build air pressure upon accumulation of gases within the housing when the first and second sealing members are closed, wherein upon the building of adequate pressure within the piston the second sealing member is opened to allow further release of gases from the valve.

13. The venting valve for releasing gases according to claim 7, wherein the shaft is configured to make sealing contact with three seals.

14. The venting valve for releasing gases according to claim 13, wherein one of the three seals comprise a cap pressure seal.

15. The venting valve for releasing gases according to claim 13, wherein one of the three seals comprise a piston pressure orifice.

16. The venting valve for releasing gases according to claim 13, wherein one of the three seals comprise a low flow vent.

17. The venting valve for releasing gases according to claim 13, wherein the three seals comprise a cap pressure seal, a piston pressure orifice, and a low flow vent.

18. The venting valve for releasing gases according to claim 17, wherein the pressure above the cap pressure seal and below the piston pressure orifice are substantially equal during operation of the valve.

19. The venting valve for releasing gases according to claim 17, wherein the pressure above the cap pressure seal and below the piston pressure orifice are substantially equal during operation of the valve; and the pressure between the cap pressure seal and the piston pressure orifice is less than the pressure above the cap pressure seal and below the piston pressure orifice during operation of the valve.

20. A venting valve for releasing gases entrapped within the valve, the venting valve comprising:
   a) a housing having a lower opening for the entry of media and gases, and an upper opening for exit of gases;
   b) a float located within the housing, the float in mechanical communication provided with a float shaft that is at least partially hollow, the float shaft having a first and second diameter;
   wherein the float shaft has a first portion and a second portion maintained at substantially equalized pressures, plus an intermediate portion between the first and second portions, the intermediate portion at a lower pressure than the equalized pressure;
   further comprising a low-flow vent the low-flow vent comprising a seal configured to engage the first and second diameters of the float shaft;
   wherein pressure above a cap pressure seal and below a piston pressure orifice are substantially equal during operation of the valve; and pressure between the cap pressure seal and the piston pressure orifice is less than the pressure above the cap pressure seal and below the piston pressure orifice during operation of the valve.

* * * * *